US008640236B2

(12) United States Patent
Retana et al.

(10) Patent No.: US 8,640,236 B2
(45) Date of Patent: Jan. 28, 2014

(54) PERFORMING A DEFENSIVE PROCEDURE IN RESPONSE TO CERTAIN PATH ADVERTISEMENTS

(75) Inventors: Alvaro E. Retana, Raleigh, NC (US); Burjiz Pithawala, Cupertino, CA (US); David A. Sacerdote, Palo Alto, CA (US); Keyur Patel, San Jose, CA (US); Russell I. White, Holly Springs, NC (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 13/169,121

(22) Filed: Jun. 27, 2011

(65) Prior Publication Data

US 2012/0331555 A1     Dec. 27, 2012

(51) Int. Cl.
*G06F 11/00* (2006.01)
*H04L 29/06* (2006.01)

(52) U.S. Cl.
USPC .......... 726/23; 726/22; 726/24; 726/25; 726/26; 713/153; 713/154

(58) Field of Classification Search
USPC .............. 726/22–26; 713/153, 154
See application file for complete search history.

(56) References Cited

U.S. PATENT DOCUMENTS

| 6,834,310 | B2* | 12/2004 | Munger et al. | 709/232 |
|---|---|---|---|---|
| 7,554,930 | B2* | 6/2009 | Gaddis et al. | 370/254 |
| 7,567,522 | B2* | 7/2009 | Borowski | 370/254 |
| 8,219,800 | B2* | 7/2012 | Levy-Abegnoli et al. | 713/154 |
| 2002/0021675 | A1* | 2/2002 | Feldmann | 370/254 |
| 2004/0240669 | A1* | 12/2004 | Kempf et al. | 380/277 |
| 2005/0074003 | A1* | 4/2005 | Ball et al. | 370/389 |
| 2006/0182034 | A1* | 8/2006 | Klinker et al. | 370/238 |
| 2008/0127338 | A1* | 5/2008 | Cho et al. | 726/22 |
| 2009/0182896 | A1* | 7/2009 | Patterson et al. | 709/241 |

OTHER PUBLICATIONS

Rekhter, Y., et al., "*A Border Gateway Protocol 4 (BGP-4)*", Network Working Group, Request for Comments: 4271, Category: Standards Track, Sections 1.1, 4.3, and 5.1.2; 115 pages, Jan. 2006.
Goldberg, Sharon, et al., "*How Secure are BGP Security Protocols?*", NANOG 49, San Francisco, California, 57 pages, Jun. 15, 2010.

* cited by examiner

*Primary Examiner* — Krisna Lim
(74) *Attorney, Agent, or Firm* — Baker Botts L.L.P.

(57) ABSTRACT

In certain embodiments, performing a defensive procedure involves receiving at a first speaker of a first autonomous system a path advertisement from a second speaker of a second autonomous system. The path advertisement advertises a path from the second speaker of the second autonomous system. It is determined whether the second autonomous system is a stub autonomous system and whether a path length of the path is greater than one. If the second autonomous system is a stub and the path length is greater than one, a defensive measure is performed for the path. Otherwise, a default procedure is performed for the path.

20 Claims, 1 Drawing Sheet

US 8,640,236 B2

PERFORMING A DEFENSIVE PROCEDURE IN RESPONSE TO CERTAIN PATH ADVERTISEMENTS

TECHNICAL FIELD

The present disclosure relates generally to telecommunications.

BACKGROUND

A cyber attack (such as a denial-of-service attack) may involve saturating a target with requests to slow down or prevent the target from responding to legitimate requests. The attack may force the target to reset, consume the target's resources to provide the service, and/or obstruct communication between the target and legitimate users. In certain situations, it may be desired to reduce attacks.

DESCRIPTION OF EXAMPLE EMBODIMENTS

Overview

In certain embodiments, performing a defensive procedure involves receiving at a first speaker of a first autonomous system a path advertisement from a second speaker of a second autonomous system. The path advertisement advertises a path from the second speaker of the second autonomous system. It is determined whether the second autonomous system is a stub autonomous system and whether a path length of the path is greater than one. If the second autonomous system is a stub and the path length is greater than one, a defensive measure is performed for the path. Otherwise, a default procedure is performed for the path.

Description

Figure 1:
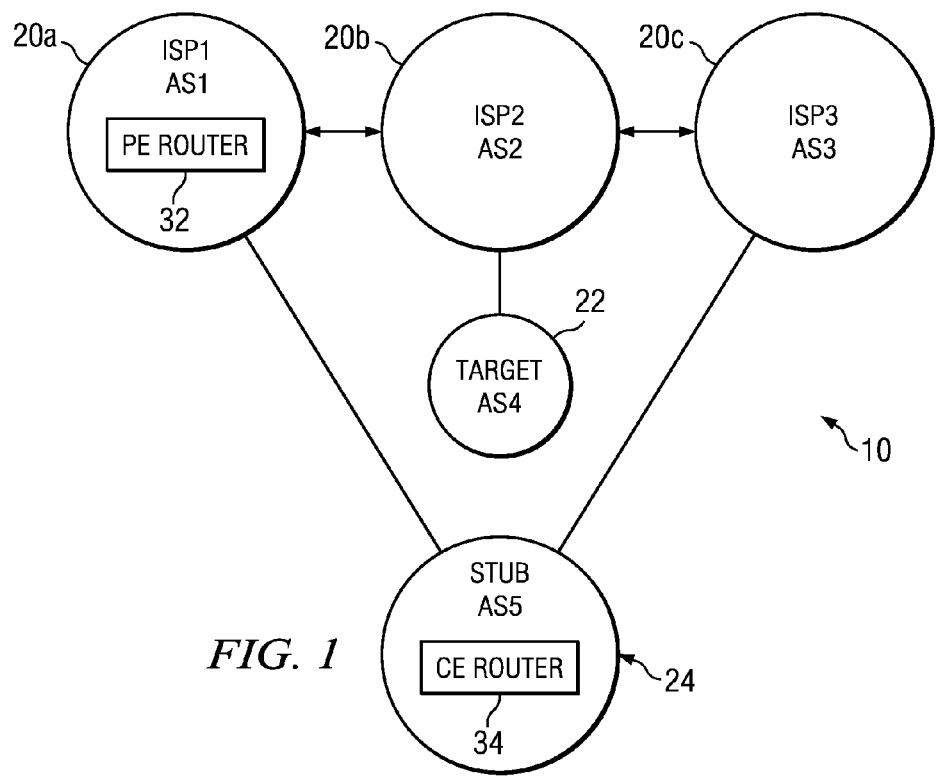
FIG. 1 illustrates an example of a network that includes a router that performs a defensive procedure in response to certain advertisements.

FIG. 1 illustrates an example of a network 10 that includes a router that performs a defensive procedure. In the illustrated example, network 10 includes autonomous systems 20 (20a-c), a target autonomous system 22, and a stub autonomous system 24 coupled as illustrated. Autonomous systems 20a-c have identifiers AS1, AS2, and AS3, respectively, and may be supported by Internet service providers (ISPs) with identifiers ISP1, ISP2, and ISP3, respectively. Autonomous system 20a includes a provider edge (PE) router 32. Target autonomous system 22 has identifier AS4. Stub autonomous system 24 has identifier AS5 and includes a client edge (CE) router 34. Stub autonomous system 24 is a customer of ISP1 and ISP3.

In certain embodiments, a first speaker (such as PE router 32) of a first autonomous system (such as autonomous system AS1 20a) receives a path advertisement from second speaker (such as CE router 34) of a second autonomous system (such as autonomous system AS5 24). The path advertisement advertises a path from the second speaker of the second autonomous system. The first speaker determines whether the second autonomous system is a stub autonomous system and whether the path length of the path is greater than one. If the second autonomous system is a stub and the path length is greater than one, the first speaker performs a defensive measure for the path. Otherwise, the first speaker performs a default procedure for the path.

In certain situations, Internet service providers may select paths according to the following sequence of preferences: first select less expensive paths, and then select shorter paths. Accordingly, a client of an Internet service provider can advertise a less expensive path in order to attract a large fraction of traffic. In certain situations, the client may attract the large fraction of traffic in order to mount a cyber attack, such as a denial-of-service attack, on the Internet service provider. Certain embodiments may lower the probability of or even prevent such attack by performing a defensive procedure.

In certain embodiments, an autonomous system (AS) 20 may be a set of connected Internet Protocol (IP) routing prefixes under the control of one or more network operators (such as an Internet service provider) that present a common routing policy to the Internet. In Border Gateway Protocol (BGP) routing, a unique autonomous system number (ASN) is allocated to each autonomous system.

An autonomous system 20 may be a multihomed, stub, or transit autonomous system. A multihomed autonomous system maintains connections to more than one other autonomous system, which allows the autonomous system to remain connected to the Internet if one of their connections fails. A multihomed autonomous system does not allow traffic from one autonomous system to pass through on its way to another autonomous system. A stub autonomous system (such as stub autonomous system AS5 24) may be connected to only one other autonomous system and/or may not have peering agreements to carry traffic for other autonomous systems. A stub autonomous system may have peering with other autonomous systems that is not reflected in public route-view servers. A transit autonomous system provides connections through itself to other networks. That is, network A can use a transit autonomous system to connect to network B.

A first autonomous system 20 may be a peer of or a customer of a second autonomous system 20. For example, autonomous systems 20a-c are peer autonomous systems 20, and stub autonomous system 24 is a customer of autonomous systems 20a,c. In certain situations, Internet service providers may select paths to customers over paths to peers.

A path advertisement indicates the autonomous systems that a path traverses. In certain embodiments, a path advertisement may include an AS_PATH path attribute. An AS_PATH path attribute comprises of a sequence of AS path segments that identify the autonomous systems through which routing information carried in an UPDATE message has passed. An AS path segment may be represented by a triple <path segment type, path segment length, path segment value>. The path segment type field may describe the type of set of autonomous systems. The set may or may not be in the order the autonomous systems were traversed. The path segment value field may include the autonomous system numbers of the autonomous systems of the path segment. The path segment length field may indicate the path length, and may include the number of autonomous systems in the path segment value field. A BGP speaker propagates a path by adding its own AS number to an UPDATE message.

A router 32, 34 may be a network element (such as a router, gateway, switch, or other routing device) that may be configured as a BGP speaker. Examples of BGP speakers may include a PE router 32 and CE router 34. PE router 32 may be a router on the provider premises that connects to a customer. CE router 34 may be a router at the customer premises that connects to an Internet service provider.

In certain embodiments, a speaker performs a defensive measure if a path is suspected to be involved in an attack. A defensive measure is used to avoid or decrease the possibility of using a suspicious path. Any suitable defensive measure may be used. In certain embodiments, a defensive measure may involve applying a lower weight to a path. In the embodiments, a weight that affects the probability that a path is selected for use may be applied to the path. A lower weight decreases the probability that the path is selected, and a higher weight increases or at least does not decrease the probability that the path is selected. In certain embodiments, the defensive measure may involve applying a lower weight to a suspicious path, and the default procedure may involve applying a higher weight to a path that is not suspicious. The lower weight may decrease probability of an attack. In certain embodiments, the lower weight still allows the path to operate as a backup path, as discussed with reference to FIG. 3.

In certain embodiments, a defensive measure may involve applying a filter to the path to permit or deny particular packets. For example, packets from an authorized source may be permitted, or packets from a suspicious source may be denied. In certain embodiments, a BGP filter may permit or deny one or more packets with Internet Protocol (IP) addresses specified on a prefix list. The IP address may be for a classful network, a subnet, or a single host route.

In certain embodiments, there may be an option to enable or disable the defensive measure. Product specifications may describe the defensive measure and/or the option to enable or disable the defensive measure.

Figure 2:
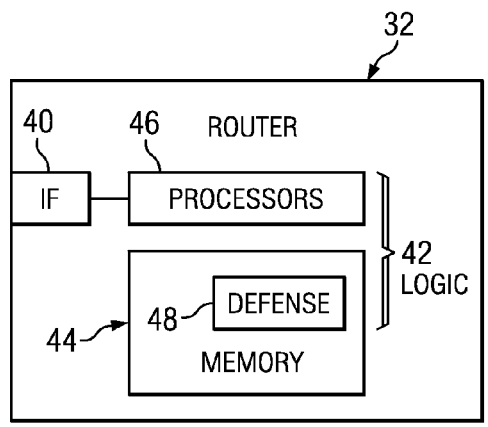
FIG. 2 illustrates an example of a router that may perform a defensive procedure in response to certain advertisements.

FIG. 2 illustrates an example of a router 32 that may perform a defensive procedure in response to certain advertisements. In the illustrated example, router 32 includes one or more interfaces 40, logic 42, and one or more memories. Logic 42 includes one or more processors 46 and one or more applications, such as a defense module 48. In certain embodiments, router 32 may be an edge router. For example, an internet service provider may configure a provider edge router with defense module 48, which may prevent customers from causing problems.

In certain embodiments, defense module 48 receives a path advertisement from a speaker of an autonomous system. Defense module 48 determines whether the autonomous system is a stub autonomous system and whether the path length of the path is greater than one. If the second autonomous system is a stub and the path length is greater than one, defense module 48 performs a defensive measure for the path. Otherwise, defense module 48 performs a default procedure for the path.

Figure 3:
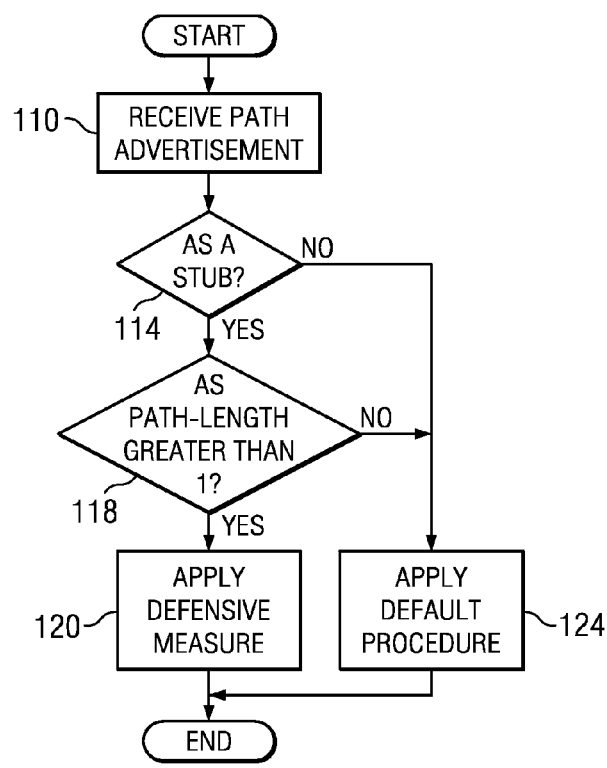
FIG. 3 illustrates an example of a method for performing a defensive procedure in response to certain advertisements.

FIG. 3 illustrates an example of a method for performing a defensive procedure in response to certain advertisements. In certain embodiments, the method may be performed by PE router 32. In the example, the first speaker is PE router 32 of target autonomous system AS4, and the second speaker is CE router 34 of stub autonomous system AS5. The second speaker is mounting an attack against target autonomous system AS4.

A first speaker of a first autonomous system receives a path advertisement from a second speaker of a second autonomous system at step 110. The path advertisement advertises a path from the second speaker. In the example, stub autonomous system AS5 is a customer of ISP1, so ISP1 prefers to send packets destined for autonomous system AS4 through autonomous system AS5. The attacker advertises the AS-path <AS5, AS3, AS2, AS4> to target autonomous system AS4.

The first speaker determines whether the second autonomous system is a stub autonomous system at step 114. The first speaker may maintain a list indicating whether an autonomous system is a stub and may use this list to determine whether the second autonomous system is a stub. If the second autonomous system is not a stub autonomous system, the method proceeds to step 124. If the second autonomous system is a stub autonomous system, the method proceeds to step 118. In the example, AS5 is listed as a stub autonomous system.

The first speaker determines whether a path length of the path is greater than one at step 118. The path length may be obtained from a path segment length field. If the path length is not greater than one, the method proceeds to step 124. If the path length is greater than one, the method proceeds to step 120. In the example, the path length of the AS-path is four.

A defensive measure is performed for the path at step 120. In certain embodiments, the defensive measure may involve applying a filter to the path or applying a lower weight to the path. The defensive measure may decrease the probability of an attack. In the examples, the defensive measure is performed. For example, ISP1 may assign the path a lower weight. As a result, traffic will not be routed through AS5, and the attack may be avoided.

A default procedure is performed for the path at step 124. In certain embodiments, the default procedure may involve applying a higher weight to the path.

In certain situations, the lower weight still allows stub autonomous system AS5 to operate a backup carrier of traffic. For example, if the link between ISP1 and ISP2 fails, the lower weight path to target autonomous system AS4 advertised by stub autonomous system AS5 would be the best path, and traffic may flow through the lower weight path.

In certain situations, an investigator may set up a test arrangement to determine whether a PE router can perform the defensive measure. In the test arrangement, the PE router and a core router are assigned AS number AS3. A CE router CE1 with AS number AS1 is coupled to PE router. A CE router CE2 with AS number AS2 is coupled to CE1 router, yielding the following test arrangement:

Core<->PE<->CE1<->CE2

CE1 and CE2 routers are each instructed to advertise a network. The BGP update messages that the PE router sends to the core router are sniffed. If the CE1 paths are preferred over the CE2 paths, then PE router is implementing the defensive measure.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of defense module 48 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses disclosed may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving at a first routing device of a first autonomous system a path advertisement from a second routing device of a second autonomous system; the path advertisement advertising a path from the second routing device of the second autonomous system to a target autonomous system;
   determining whether the second autonomous system is a stub autonomous system;
   based on the path advertisement, determining whether a path length of the path is greater than one, the path length identifying a number of autonomous system in the path from the second router of the second autonomous system to the target autonomous system;
   if the second autonomous system is a stub and the path length is greater than one, performing a defensive measure to decrease the possibility of an attack on the path; and
   otherwise, performing a default procedure the path.

2. The method of claim 1, the determining whether the second autonomous system is a stub further comprising:
   accessing a list maintained at the first routing device, the list indicating whether an autonomous system is a stub.

3. The method of claim 1, the determining whether the path length of the path is greater than one further comprising:
   obtaining the path length from a path segment length field of the path advertisement.

4. The method of claim 1, the performing the defensive measure for the path further comprising:
   applying a filter to the path to permit or deny one or more Internet Protocol (IP) addresses.

5. The method of claim 1:
   the performing the defensive measure for the path further comprising applying a lower weight to the path; and
   the performing the default procedure for the path further comprising applying a higher weight to the path, the lower weight decreasing the probability that the path is selected.

6. The method of claim 5, the lower weight decreasing probability of an attack.

7. The method of claim 5, the lower weight allowing the path to operate as a backup path.

8. An apparatus comprising:
   a memory of a first routing device of a first autonomous system, the memory configured to store computer executable instructions; and
   one or more processors coupled to the memory, the processors configured, when executing the instructions, to:
   receive a path advertisement from a second routing device of a second autonomous system, the path advertisement advertising a path from the second routing device of the second autonomous system to a target autonomous system;
   determine whether the second autonomous system is a stub autonomous system;
   based on the path advertisement, determine whether a path length of the path is greater than one, the path length identifying a number of autonomous system in the path from the second router of the second autonomous system to the target autonomous system;
   if the second autonomous system is a stub and the path length is greater than one, perform a defensive measure for the path; and
   otherwise, perform a default procedure for the path.

9. The apparatus of claim 8, the determining whether the second autonomous system is a stub further comprising:
   accessing a list maintained at the first routing device, the list indicating whether an autonomous system is a stub.

10. The apparatus of claim 8, the determining whether the path length of the path is greater than one further comprising:
    obtaining the path length from a path segment length field of the path advertisement.

11. The apparatus of claim 8, the performing the defensive measure for the path further comprising:
    applying a filter to the path to permit or deny one or more Internet Protocol (IP) addresses.

12. The apparatus of claim 8:
 the performing the defensive measure for the path further comprising applying a lower weight to the path; and
 the performing the default procedure for the path further comprising applying a higher weight to the path, the lower weight decreasing the probability that the path is selected.

13. The apparatus of claim 12, the lower weight decreasing probability of an attack.

14. The apparatus of claim 12, the lower weight allowing the path to operate as a backup path.

15. One or more non-transitory computer readable media when executed operable to:
 receive at a first routing device of a first autonomous system a path advertisement from a routing device speaker of a second autonomous system, the path advertisement advertising a path from the second routing device of the second autonomous system to a target autonomous system;
 determine whether the second autonomous system is a stub autonomous system;
 based on the path advertisement, determine whether a path length of the path is greater than one, the path length identifying a number of autonomous systems in the path from the second router of the second autonomous system to the target autonomous system;
 if the second autonomous system is a stub and the path length is greater than one perform a defensive measure to decrease the possibility of an attack on the path; and
 otherwise, perform a default procedure for the path.

16. The media of claim 15, the determining whether the path length of the path is greater than one further comprising:
 obtaining the path length from a path segment length field of the path advertisement.

17. The media of claim 15, the performing the defensive measure for the path further comprising:
 applying a filter to the path to permit or deny one or more Internet Protocol (IP) addresses.

18. The media of claim 15:
 the performing the defensive measure for the path further comprising applying a lower weight to the path; and
 the performing the default procedure for the path further comprising applying a higher weight to the path, the lower weight decreasing the probability that the path is selected.

19. The media of claim 18, the lower weight decreasing probability of an attack.

20. The media of claim 18, the lower weight allowing the path to operate as a backup path.

\* \* \* \* \*